(12) United States Patent
Carrera Garcia et al.

(10) Patent No.: US 11,262,143 B2
(45) Date of Patent: Mar. 1, 2022

(54) COMPACT HEAT EXCHANGER

(71) Applicant: Borgwarner Emissions Systems Spain, S.L.U., Vigo (ES)

(72) Inventors: Julio Abraham Carrera Garcia, Vigo (ES); Xoan Xose Hermida Dominguez, Gondomar (ES)

(73) Assignee: Borgwarner Emissions Systems Spain, S.L.U.

( * ) Notice: Subject to any disclaimer, the term of this patent is extended or adjusted under 35 U.S.C. 154(b) by 185 days.

(21) Appl. No.: 16/122,263

(22) Filed: Sep. 5, 2018

(65) Prior Publication Data

US 2019/0072343 A1 Mar. 7, 2019

(30) Foreign Application Priority Data

Sep. 6, 2017 (EP) .................................... 17382595

(51) Int. Cl.
*F28F 9/26* (2006.01)
*F28D 7/16* (2006.01)
(Continued)

(52) U.S. Cl.
CPC .............. *F28F 9/26* (2013.01); *F02M 26/32* (2016.02); *F28D 7/16* (2013.01); *F28D 7/1653* (2013.01);
(Continued)

(58) Field of Classification Search
CPC .......... F02G 5/00; F02M 26/29; F02M 26/32; F28F 9/0219; F28F 9/0224; F28F 9/0231; F28F 9/0236; F28F 9/0239; F28F 9/0241; F28F 9/26; F28F 2265/26; F28D 7/16; F28D 7/1653; F28D 2021/004
(Continued)

(56) References Cited

U.S. PATENT DOCUMENTS 240,220 A * 4/1881 Ashcroft ............... F28F 9/0219
165/158
2,468,903 A * 5/1949 Villiger ................. F28D 7/1669
165/155
(Continued)

FOREIGN PATENT DOCUMENTS

DE 102005037156 A1 2/2007
EP 1903207 A1 3/2008
(Continued)

OTHER PUBLICATIONS

Search Report from EP 17382595, dated Feb. 16, 2018, pp. 1-5.

*Primary Examiner* — Len Tran
*Assistant Examiner* — Gustavo A Hincapie Serna
(74) *Attorney, Agent, or Firm* — Lerner, David, Littenberg, Krumholz & Mentlik, LLP (57) ABSTRACT

The present invention relates to a compact heat exchange device, applicable to either EGR (Exhaust Gas Recirculation) systems for reducing nitrogen oxide emission, or to WHRS systems (Waste Heat Recovery Systems), both in internal combustion engines.
The design of the heat exchanger is characterized by a configuration that incorporates technical solutions intended for compensating for the differential expansions between the tube bundle and the shell, as well as other variables relating to thermal fatigue, where said solutions result in a compact device.

15 Claims, 5 Drawing Sheets

(51) Int. Cl.
*F28D 21/00* (2006.01)
*F02M 26/32* (2016.01)
*F28F 9/02* (2006.01)

(52) U.S. Cl.
CPC ........ *F28D 21/0003* (2013.01); *F28F 9/0219* (2013.01); *F28D 2021/004* (2013.01); *F28F 2265/26* (2013.01)

(58) Field of Classification Search
USPC ................................ 165/81, 82; 123/568.12
See application file for complete search history.

(56) References Cited

U.S. PATENT DOCUMENTS

| | | | | |
|---|---|---|---|---|
| 3,603,383 | A * | 9/1971 | Michael | F28F 9/0239 165/158 |
| 3,812,907 | A * | 5/1974 | Linning | F28F 9/0219 165/83 |
| 3,850,231 | A * | 11/1974 | Creek | F28F 9/0236 165/83 |
| 3,973,621 | A * | 8/1976 | Bow | F28D 7/1653 165/83 |
| 2003/0047171 | A1* | 3/2003 | Vaughan | F02M 26/73 123/568.12 |
| 2005/0034843 | A1* | 2/2005 | Schindler | F01N 3/043 165/83 |
| 2009/0020275 | A1* | 1/2009 | Neher | F02M 26/32 165/170 |
| 2009/0056922 | A1* | 3/2009 | Hemminger | F28F 9/0219 165/158 |
| 2010/0083646 | A1* | 4/2010 | Poppe | B01D 39/12 60/311 |
| 2011/0162826 | A1* | 7/2011 | Garret | F28F 9/0219 165/157 |
| 2011/0192570 | A1* | 8/2011 | Agee | F28F 9/0219 165/83 |
| 2014/0034028 | A1* | 2/2014 | Zhang | F02M 26/32 123/568.12 |
| 2014/0223738 | A1* | 8/2014 | Agee | F28F 9/001 29/890.03 |
| 2014/0299115 | A1* | 10/2014 | Zhang | F28D 7/00 123/568.12 |
| 2015/0027666 | A1* | 1/2015 | Hisanaga | F28D 7/1684 165/100 |
| 2015/0204623 | A1* | 7/2015 | Neher | F28D 7/1684 165/81 |
| 2015/0233649 | A1* | 8/2015 | Hughes | F28D 15/00 165/166 |
| 2016/0305713 | A1* | 10/2016 | Grande Fernández et al. | F28F 9/0221 |
| 2019/0017471 | A1* | 1/2019 | Sugimoto | F28D 7/0075 |

FOREIGN PATENT DOCUMENTS

| | | | |
|---|---|---|---|
| EP | 3196579 A1 | 7/2017 | |
| GB | 1154809 A * | 6/1969 | ................ F28F 9/22 |
| GB | 1356339 A * | 6/1974 | ................ F27B 7/40 |
| WO | 2007082774 A2 | 7/2007 | |
| WO | WO-2010098321 A * | 9/2010 | ............ F02M 26/32 |
| WO | 2013139113 A1 | 9/2013 | |

* cited by examiner

COMPACT HEAT EXCHANGER

CROSS-REFERENCE TO RELATED APPLICATIONS

This application claims the benefit of the filing date of European Patent Application No. 17382595.1, filed on Sep. 6, 2017, the disclosure of which is hereby incorporated herein by reference.

OBJECT OF THE INVENTION

The present invention relates to a compact heat exchange device, applicable to either EGR (Exhaust Gas Recirculation) systems for reducing nitrogen oxide emission, or to WHRS systems (Waste Heat Recovery Systems), both in internal combustion engines.

The design of the heat exchanger is characterized by a configuration that incorporates technical solutions intended for compensating for the differential expansions between the tube bundle and the shell, as well as other variables relating to thermal fatigue, where said solutions result in a compact device.

BACKGROUND OF THE INVENTION

One of the fields of the art that has been subjected to intensive development is the field of heat exchangers for EGR systems where recirculated gas must be cooled before being introduced back into the internal combustion engine's power supply system.

This device receives the exhaust gas and reduces its temperature to one close to the temperature of the liquid coolant when it is necessary to recirculate gases. Otherwise the temperature of the entire device will be the temperature of the liquid coolant. These temperature differences are observed primarily between the tube bundle of the heat exchanger and the shell, generating significant differential expansions in the longitudinal direction defined by the tube bundle.

To avoid damage due to thermal fatigue, solutions like the one described in patent application WO2013/139113 are known in the state of the art. This patent application discloses a heat exchanger formed by a shell housing a tube bundle located between two baffles. The liquid coolant circulates through the inside of the shell, covering the tube bundle such that the heat from the recirculated gas is transferred to the liquid coolant through the surface of the tube bundle. To prevent the stressing generated by the differential expansion between the tube bundle and the shell, one of the baffles is fixed to the shell at one of the ends and the other baffle is a floating baffle. Floating baffle is understood to mean a baffle that is not prevented from moving given the forces generated by the thermal expansion of the tube bundle. The particular way of configuring the floating baffle in this application consists of not fixing it directly to the shell but rather prolonging it according to the longitudinal direction to the hot gas inlet through a bellows-type tubular body.

With this configuration, the expansion of the tube bundle gives rise to compression of the bellows which acts like an elastically deformable element compensating for the expansion in the longitudinal direction with respect to the shell, which remains at the temperature of the liquid coolant and therefore has a much lower degree of thermal expansion.

Although this solution allows compensating for the expansion of the tube bundle in the longitudinal (axial) direction, it has several drawbacks. The first drawback is the increase in the length of the heat exchanger since the prolongation segment from the floating baffle to the hot gas inlet, which allows the inclusion of a bellows, increases the length of the heat exchanger according to the longitudinal direction. This additional segment is not intended for heat exchange and requires more space in the engine compartment, a space that is already quite scarce.

Another drawback of this type of heat exchanger is the difficulty in cooling the floating baffle. One of the faces of the floating baffle is directly exposed to the hot gas entering the heat exchanger. The other face of the baffle is in contact with the liquid coolant; nevertheless, its position is prone to the presence of stagnation regions which give rise to boiling, and therefore thermal fatigue, effects.

The reason these stagnation regions exist is because the liquid coolant inlet or outlet at the end of the heat exchanger where the floating baffle is located is established close to the bellows for suitable cooling. The liquid coolant flows from the annular space surrounding the bellows to the other end of the heat exchanger surrounding the perimeter of the floating baffle and therefore forming a stagnation region close to the central region of said floating baffle. It is precisely this central region that is directly exposed to the entry of the hot gas.

These same problems are observed in heat exchangers intended for heat recovery. In this case, the main purpose is to increase the temperature of the liquid coolant, for example for later heat energy recovery, preventing the energy from the hot gas from being wasted in the atmosphere.

The present invention solves both problems by means of incorporating an additional part that will be referred to as manifold element which acts like an elastically deformable element, and it furthermore establishes a liquid coolant distribution chamber making it easier for the liquid coolant to enter or exit, such that the baffle of the tube bundle does not have stagnation regions.

A technical problem additionally solved with this additional part is the ease with which the heat exchanger thus built is assembled.

DESCRIPTION OF THE INVENTION

The present invention relates to a compact heat exchanger for the heat exchange between a hot gas and a liquid coolant comprising:
a) a shell extending according to a longitudinal direction X-X' to allow the passage of the liquid coolant between a liquid coolant inlet/outlet and a liquid coolant outlet/inlet;
b) a heat exchange tube bundle for the passage of the hot gas, housed in the shell, extending according to longitudinal direction X-X' between a first fixing baffle located on the hot gas inlet/outlet side, preferably at the inlet, and a second fixing baffle located on the hot gas outlet/inlet side, preferably at the outlet;
c) the second fixing baffle is attached to the shell.

Throughout the text, expressions such as inlet/outlet are used for a given fluid access and outlet/inlet for another fluid access for the same fluid in a given space. This is the case of the inlet/outlet for the entry/exit of liquid coolant with respect to the inside of the shell or the inlet/outlet for the entry/exit of hot gas with respect to the inside of the tubes of the tube bundle. In these cases, the order is relevant such that if the inlet/outlet order is used in one access, the outlet/inlet order is used in the other, and it must be interpreted that when the inlet applies in one, the outlet applies in the other (first option mentioned), and vice versa (second option mentioned).

This is the particular case of the hot gas, where it is clearly established that the preferred option is the hot gas inlet being located on the side where the element identified as the first baffle is located, the outlet being the opposite end where the element identified as the second baffle is located. As this is the preferred option, it will be this option that is described in greater detail in each of the examples. Nevertheless, the second option and its utility are described at the end of this description and before the detailed description, based on examples shown in the drawings.

Continuing with the description of the first option, the shell houses the tube bundle such that between the shell and the tube bundle there is a space intended for the passage of the liquid coolant. The passage of the liquid coolant through the spaces between tubes allows the heat exchange between the hot gas circulating through the inside of the tubes of the tube bundle and the liquid coolant. The shell can be built in a single part or, according to another embodiment, in several parts to make it easier to manufacture.

The direction of the tubes of the tube bundle defines the longitudinal direction identified as direction X-X'. It is therefore possible to define, for example, cross sections as those that are perpendicular to longitudinal direction X-X'.

The tube bundle extends between two baffles, a first fixing baffle located on the hot gas inlet side and corresponding to the floating baffle and a second fixing baffle attached to the shell and corresponding to the fixed baffle.

Additionally:

d) the first fixing baffle is attached to the shell by means of a tubular-shaped manifold element wherein:
  i. the end of the manifold element located at the hot gas inlet/outlet end according to longitudinal direction X-X' comprises an elastically deformable perimetral collar with an outer attachment region and an inner attachment region, wherein the outer attachment region has a characteristic diameter that is larger than the characteristic diameter of the inner attachment region, characteristic diameter being defined as four times the area of the cross section divided by the perimeter of said section, such that
     the first baffle is attached to the manifold element through the inner attachment region of the manifold element, and
     the outer attachment region of the manifold element is attached to the shell,
  ii. at least one tubular segment of the manifold element extends according to longitudinal direction X-X' from the perimetral collar to the hot gas outlet/inlet side and is housed inside the shell, establishing a perimetral chamber in fluid communication with the liquid coolant inlet/outlet and in fluid communication with the inside of the shell.

The manifold element is a single or composite part comprising the tubular segment and the elastically deformable perimetral collar.

The elastically deformable perimetral collar of the manifold element links the floating baffle, i.e., the element identified as the first baffle, and the shell. These two elements are linked by means of two attachment regions, i.e., the outer attachment region and the inner attachment region, thereby preventing longitudinally configured elastically deformable elements from prolonging the length of the device.

The outer attachment region is the region through which the elastically deformable perimetral collar is attached to the shell, and the inner attachment region is the region through which the elastically deformable perimetral collar is attached to the first baffle. The attachment between two elements such as those indicated does not exclude the use of another element located between them, for example a manifold. In this case, three stacked plates giving rise to this multiple attachment would be shown in section.

The relative preferred position between the outer attachment region and the inner attachment region is according to a cross section, although one attachment region can be slightly axially displaced with respect to the other one depending on the configuration of the perimetral collar, in order for the latter to be elastically deformable. The condition that establishes the outer region with respect to the inner region is that the outer region has a characteristic diameter that is larger than the inner region.

The characteristic diameter can be defined for any attachment region contained in a transverse plane. According to this transverse plane, the attachment region projects according to a closed curve having an area and a perimeter. The characteristic diameter is defined as four times the area defined by this curve divided by the perimeter. When the section is circular, this measurement coincides with the value of the diameter of the circle.

The temperature differences between the tube bundle and the shell when the hot gas passes through the tube bundle causes an expansion of the tube bundle that displaces the first baffle. This displacement is absorbed by the elastic deformation of the perimetral collar.

In turn, the tubular segment of the manifold element is prolonged according to the axial direction from the perimetral collar to the hot gas outlet/inlet end, forming a chamber for the liquid coolant between this tubular segment, the elastically deformable perimetral collar and the shell.

This chamber distributes the liquid coolant around the perimeter and is in fluid communication with the liquid coolant inlet/outlet and also with the inside of the shell. This last fluid communication is preferably by means of a slot that can be located adjacent to the first baffle according to the longitudinal direction, such that the liquid coolant inlet/outlet is by means of a jet, preferably parallel to the surface of the baffle, eliminating any stagnation region of the liquid coolant on the surface of the first baffle, which is the most exposed to the direct entry of the hot gas, preventing boiling processes and therefore reducing thermal fatigue.

The preferred positions of the liquid coolant inlet/outlet slot or slots are such that they favor the liquid coolant gaining access to the space between tubes. This is the case when using flat tubes, where the slot is positioned such that it coincides with the points of access to the space between the main planes of the flat tubes.

Configuring the manifold element as a single part means that the region located between the tubular segment and the elastically deformable collar has displacements in various directions since the elastically deformable collar allows deformations in the transverse plane; therefore particularly it also has displacements in the longitudinal direction due to thermal expansion when there are temperature changes. In the event of these displacements according to the longitudinal direction, the end of the tubular segment opposite the end where the elastically deformable perimetral collar is located will also tend to follow these axial displacements.

According to the state of the art, the baffles receive the tube bundle and are attached along the periphery thereof to both the shell and the manifold, for example the intake manifold. This structural configuration gives rise to three types of deformations through various displacements that must be absorbed:

through axial displacement from embedding the tube bundle due to the differential expansion between the tube bundle and the shell;

through perimetral displacement of the baffle due to the expansion thereof in its own plane;

through displacements due to the bulging of the baffle. In this last case, given that the baffle is attached along the perimeter to the shell and the manifold, the expansion of the tubes reaching baffle generates a convex-shaped deformation since the shell and manifold do not allow this expansion in the perimetral region. The bulging tends to compress the tubes.

After having discussed the main deformations of a baffle configured according to the state of the art, it has been found that the manifold element according to the invention is particularly suitable for absorbing all these deformations both due to the behavior thereof at the end of the elastically deformable perimetral collar and at the end opposite the end where the elastically deformable perimetral collar is located, where there are also axial displacements.

The axial displacements are absorbed by the elastically deformable perimetral collar and also by the tubular segment through the means that disassociate the axial displacement with respect to the shell. The expansion of the baffle is also compensated for with the perimetral collar, and finally the bulging of the baffle is minimized by the presence of the elastically deformable perimetral collar.

According to different embodiments that will be described in the section dedicated to detailed examples of the invention, various closure solutions for the chamber that prevent the occurrence of significant stressing due to this tendency for axial displacement at the end of the tubular segment are considered.

According to one embodiment, the tubular end of the manifold element is in contact with the surface of the shell and allows for relative displacement by sliding according to the axial direction.

According to another embodiment, the tubular end of the manifold element is attached to the shell, and in an intermediate segment between this tubular end and the other end where the perimetral collar is located there is an elastically deformable segment to compensate for axial displacements of the region of the perimetral collar.

After having discussed the most relevant elements in one configuration according to the first option, the configuration according to the second option, i.e., where the chamber formed between the manifold element and the shell is located at the hot gas outlet instead of at the hot gas inlet can be described.

The manifold element still acts in compensating for the differential expansion between the tube bundle and the shell due to the presence of the elastically deformable collar. Nevertheless, the chamber in charge of distributing the liquid coolant along the perimeter acquires an additional function other than favoring the cooling of the baffle that is most exposed to the entry of the hot gas. This function is that of operating like a tank where the collapse of bubbles generated by boiling takes place.

This works better in a heat exchange device operating in counter-current flow conditions when boiling occurs because bubbles are generated in the hot gas inlet and are rapidly discharged through the liquid coolant outlet which is located on the same side and therefore as close as possible, thereby preventing them from accumulating inside the exchange device. Nevertheless, bubbles may be detrimental to any of the devices connected to the heat exchanger and are removed directly from where they are generated, and accordingly the size and number thereof is greater than if they had to travel along the entire length of the heat exchanger and exit through the cold side, as occurs in a co-current flow operating scheme.

The presence of the chamber before the liquid coolant exits the heat exchanger greatly improves behavior with respect to thermal fatigue since it is a volume in which the bubbles can collapse, and therefore, at least the size and number thereof are reduced once they are discharged out of the device.

After having discussed this new function, the configuration of the chamber based on the incorporation of a manifold element is applicable on the hot gas inlet side according to the first preferred option, applicable on the hot gas outlet side according to the second option, and also applicable at both ends according to a third option. In this third option there would be two manifold elements with their elastically deformable perimetral collar compensating for the differential thermal expansion between the tube bundle and the shell.

It should also be indicated that the heat exchanger can make use of two or more passes. That is, in order to reduce the length of the exchanger it is divided into segments connected by conduits giving rise to 180° changes in direction of the gas to be cooled. In this case, the solution of the invention is applicable to one or more segments of the two-pass or multi-pass exchanger.

Other embodiments applicable to any of the examples will be described with the aid of the drawings.

DESCRIPTION OF THE DRAWINGS

The foregoing and other features and advantages of the invention will be more clearly understood based on the following detailed description of a preferred embodiment provided only by way of illustrative and non-limiting example in reference to the attached drawings.

DETAILED DESCRIPTION OF THE INVENTION

Figure 1:
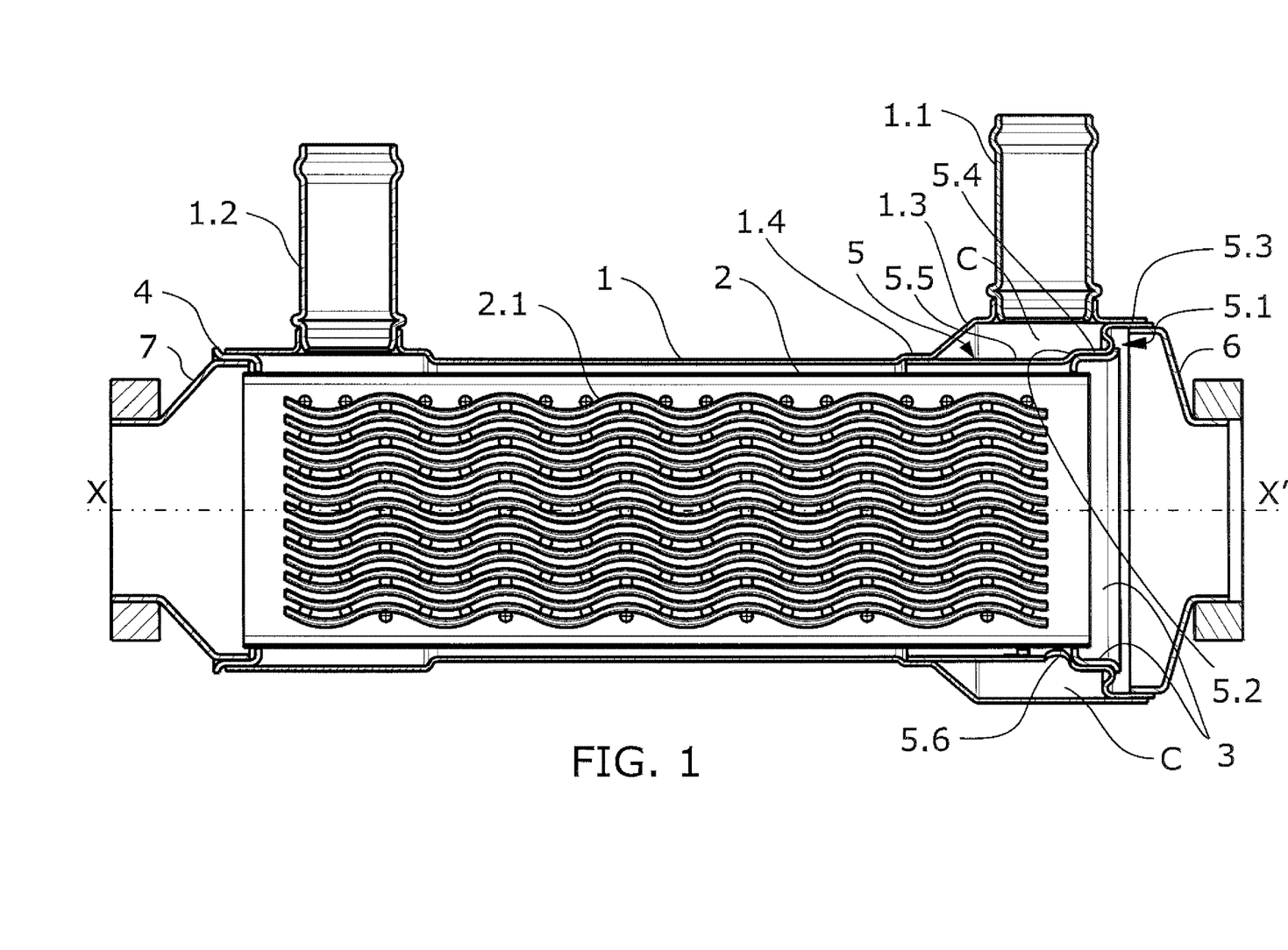
FIG. 1 shows a first embodiment of a heat exchanger. In this figure the heat exchanger is shown according to a front longitudinal section view to allow seeing the internal components.
Figure 2:
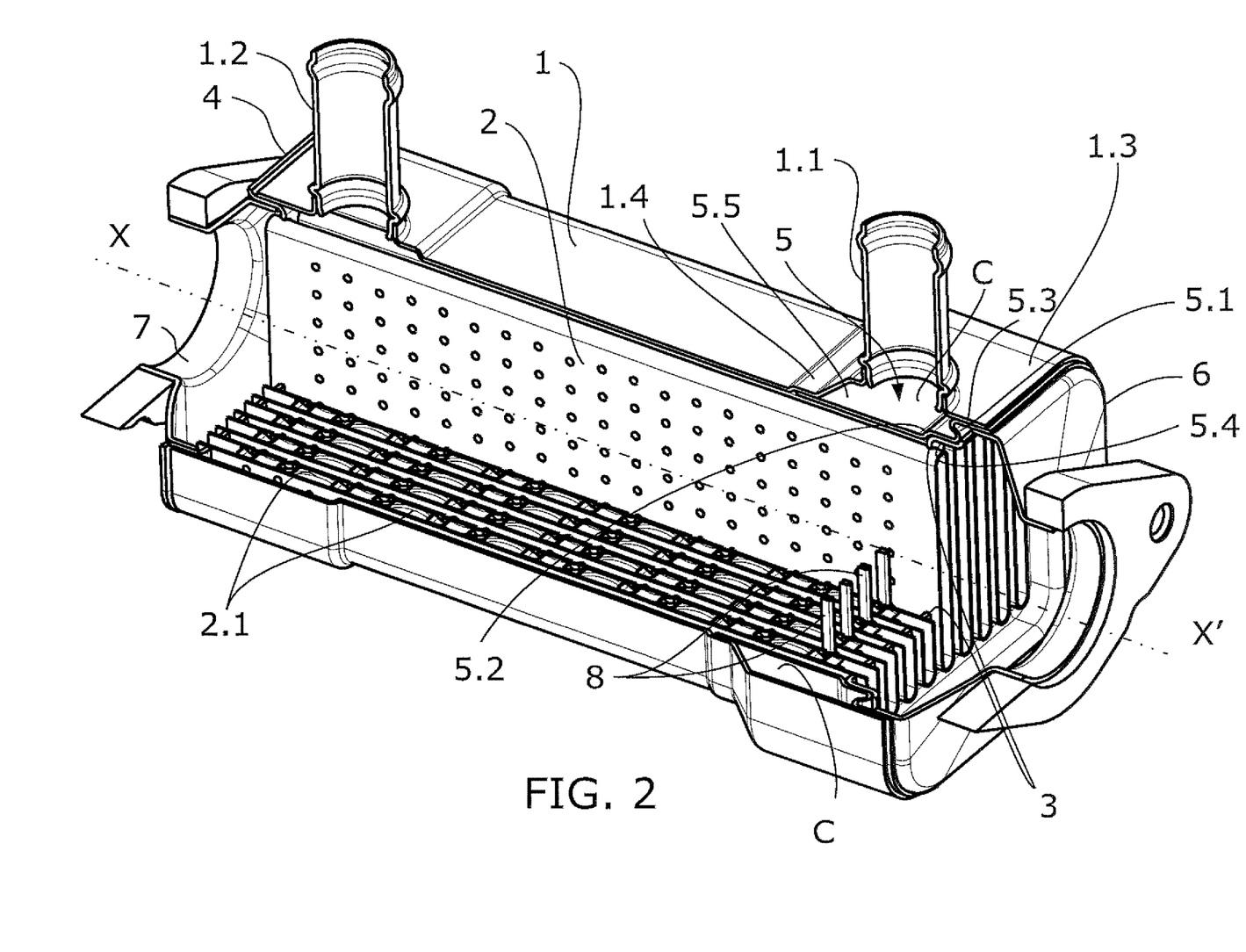
FIG. 2 shows a perspective view of a quarter section of the same embodiment to allow seeing both the external configuration of the heat exchanger and the internal elements.

According to a first inventive aspect, the present invention relates to a compact heat exchanger for an EGR system. FIG. 1 shows a first embodiment, depicted in a front view and according to a cross section along a plane containing the longitudinal axis X-X' to see the elements inside it. FIG. 2 shows a perspective view of a quarter section of the device that allows seeing the chambers formed inside the device by means of the combination of various parts.

This section shows a shell (1) having a rectangular section, with a liquid coolant inlet/outlet (1.1) at one end and an outlet/inlet (1.2), also for the liquid coolant, located at the opposite end. In this case, the inlet/outlet (1.1) is located on the right side according to the position of the section view of FIG. 1 and the outlet/inlet (1.2) is located on the left side. Throughout the description, relative positions such as right, left, up or down are used with respect to the position in which the figures are shown.

According to this embodiment, both inlets/outlets (1.1, 1.2) are located in an enlargement of the shell (1) along a longitudinal segment X-X', the enlargement (1.3) on the right side being of larger dimensions.

The inside of the shell (1) houses a tube bundle (2) of flat tubes, where the section shows the inside of a flat tube with an assembly of corrugated heat exchange fins (2.1). The flat tubes in this embodiment are arranged parallel to and spaced from one another such that there are formed channels for the passage of liquid coolant according to planes which are shown in this figure to be vertical and parallel to longitudinal direction X-X'.

The tubes of the tube bundle (2) are intended for the passage of hot gas which, through the walls of the tube, transfers heat to the liquid coolant covering the tube bundle (2). These tubes extend between a first baffle (3) and a second baffle (4), where the first baffle (3) is a floating baffle located on the right side of the drawing and the second baffle (4) is a fixed baffle located on the left side of the drawing.

In this embodiment, the first baffle (3) and the second baffle (4) are made from punched and stamped sheet metal with perimetral walls having a cylindrical configuration that allow being fitted in a housing. The second baffle (4) is fitted directly on the end of the shell (1) and the first baffle (3) is fitted on an intermediate part, i.e., the manifold element (5).

In this embodiment, the manifold element (5) is also a part made of punched and stamped sheet metal. The manifold element (5) comprises an elastically deformable perimetral collar (5.1) and a tubular segment (5.5).

In this embodiment, the perimetral collar (5.1) of the manifold element (5) is configured according to its section in corrugated form, particularly being S-shaped. According to other embodiments, the perimetral collar (5.1) is configured according to the cross section in corrugated form with at least one double transition curve allowing a higher degree of deformation with respect to the same stresses.

Figure 5:
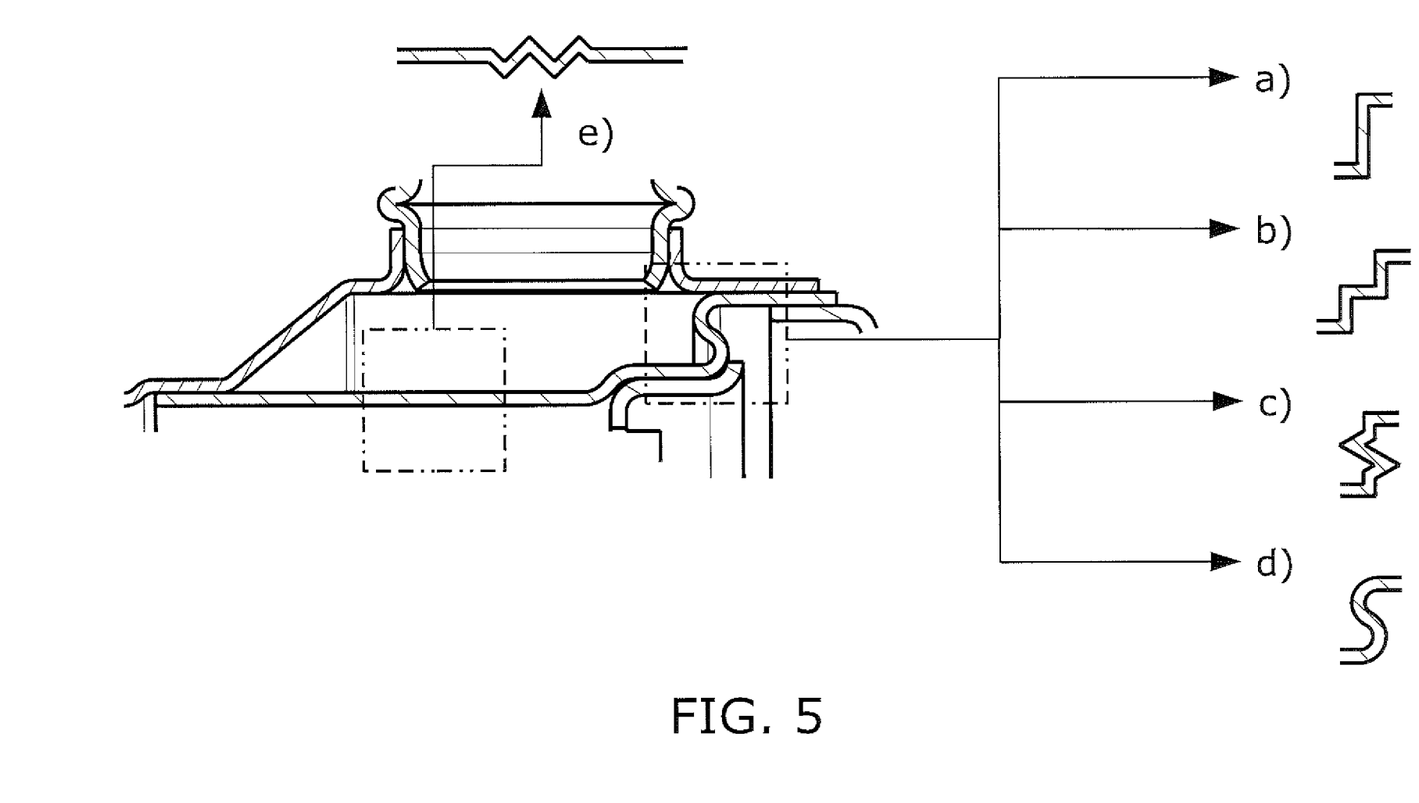
FIG. 5 schematically depicts various embodiments of the cross section of the elastically deformable perimetral collar as well as a schematic depiction of a detail of the bellows that allows absorbing axial forces in the tubular body of the manifold element.

FIG. 5 shows other alternative shapes for configuring the perimetral collar (5.1). In a simple embodiment, the perimetral collar (5.1) is a straight section in the transverse direction corresponding to a transverse plane, as can be seen in FIG. 5a). Another alternative configuration of the section of the perimetral collar (5.1) is the stepped shape shown in FIG. 5b), which readily allows being stamped. Alternatively, FIG. 5c) shows a straight section configuration in the transverse direction with the surface of the perimetral collar (5.1) having stamped protrusions that allow determining the degree of rigidity of the elastically deformable perimetral collar (5.1). The protrusions do not have to be made on just the sections corresponding to a transverse plane; they could also be made on other sections, for example in a stepped configuration.

FIG. 5d) shows the configuration with a cross section in corrugated form with at least one double transition or S-shaped curve. It is also possible to configure the perimetral collar (5.1) with a combination of the previously indicated shapes.

In any case, the perimetral collar (5.1) has an outer attachment region (5.3) and an inner attachment region (5.4), the first attachment region (5.3) being intended for attachment with the shell (1) and the second attachment region (5.4) being intended for the attachment with the first baffle (3).

In the described embodiments, the attachment between components is by means of brazing, although it would be possible to make use of other types of welding. In a first step, the components to be attached are assembled by incorporating brazing paste on contacting surfaces that are to be attached. Going through the brazing furnace melts the metal part of the brazing paste, giving rise to the brazing of the contacting parts.

In order to facilitate the assembly before going through the furnace, the outer attachment region (5.3) and the inner attachment region (5.4) are configured in the form of a seating. The seating corresponding to the outer attachment region (5.3) allows the insertion and positioning of the manifold element (5) in the shell (1), and the seating corresponding to the inner attachment region (5.4) allows the insertion and positioning of the first baffle (3) in the manifold element (5).

The insertion of each part requires the incorporation of the brazing paste.

The seating receiving the first baffle (3) comprises the inner attachment region (5.4) and a step (5.2) for supporting the first baffle (3) which limits the entry of said first baffle (3) during insertion.

So the elastically deformable perimetral collar (5.1) is sandwiched between the first baffle (3) and the shell (1), thereby allowing the tube bundle (2) to experience greater expansion than the shell (1).

As indicated above, the manifold element (5) is prolonged by means of a tubular segment (5.5) from the perimetral collar (5.1) according to the longitudinal direction to the side where the hot gas outlet is located. This tubular segment (5.5) configures a chamber (C) that is in fluid communication with the inlet/outlet (1.1) and is also in fluid communication with the inside of the shell (1) such that it allows distributing the liquid coolant circulating between the inlet/outlet (1.1) and the inside of the shell (1) and allows access to be gained to said inside of the shell (1) through any perimetral point.

The chamber (C) is demarcated by the tubular segment (5.5), the enlarged segment of the shell (1.3), and by the perimetral collar (5.1).

According to this embodiment, the expansion of the tube bundle (2) due to the increase in temperature caused by the passage of the hot gas through the inside thereof generates a displacement according to longitudinal direction X-X' of the first baffle (1). In this case, the displacement is to the right, i.e., to the hot gas inlet. Nevertheless, deformation of the perimetral collar (5.1) can be in other directions since said perimetral collar (5.1) allows for deformations in the transverse plane in which it is contained.

The displacement occurs at the expense of a deformation of the elastically deformable perimetral collar (5.1) and pulls the tubular segment (5.5) in the direction in which the expansion occurs, in this case, as indicated, primarily in the axial direction towards the right, shown in the drawing.

The tubular segment (5.5) and shell (1) establish a closure of the chamber (C) that does not necessarily have to be leak-tight since both the inside of the shell (1) and the inside of the chamber (1) contain liquid coolant. To prevent the closure between the tubular segment (5.5) and the shell (1) from imposing restrictions on the pulling effect of the tubular segment (5.5) due to deformation of the perimetral collar (5.1), a closure has been established in this embodiment by means of a sliding support between both parts, i.e., between the tubular segment (5.5) and the shell (1).

The sliding support is formed in this embodiment by means of a seating formed as an enlarged segment (1.4) configured according to a step-like section of the shell (1). The end of the tubular segment (5.5) is supported on this enlarged segment (1.4) such that during expansion, the tubular segment (5.5) slides following the axial movement allowed by the elastically deformable perimetral collar (5.1) without the closure of the chamber disappearing.

According to other embodiments, in order to prevent the closure between the tubular segment (5.5) and the shell (1) from imposing restrictions on the pulling effect of the tubular segment (5.5) due to deformation of the perimetral collar (5.1), the end of the tubular segment (5.5) is welded to the shell (1), particularly to the inner surface of the shell (1), and the tubular segment (5.5) incorporates an elastically deformable segment that allows separation of the end of the tubular segment (5.5) attached to the shell (1) and the end where the perimetral collar (5.1) is located.

A specific way in which an elastically deformable segment is incorporated in the tubular segment (5.5) is by means of a segment configured in the form of a bellows, as schematically depicted in FIG. 5 in the detail identified as e).

In the embodiment shown in FIG. 1, a slot (5.6) through which the passage of the liquid coolant between the inside of the shell (1) and the chamber (C) takes place is shown in the lower portion, i.e., in the portion that is opposite the liquid coolant inlet/outlet (1.1) with respect to the chamber (C).

A relevant case of the heat exchanger is one that operates under co-current flow conditions, such that it is at the end where the manifold element (5) is located where the entry of the liquid coolant takes place. Entry of the liquid coolant through the slot (5.6) allows injecting the liquid at a high speed in a direction parallel to the first baffle (3), such that any stagnation region of the liquid coolant is eliminated, and from a position opposite the entry of the liquid coolant.

In this case, the slot (5.6) introduces the liquid coolant in a direction parallel to the flat tubes. Another arrangement of the tubes can be achieved by simply turning the position of the baffles (3, 4) between which the tubes of the tube bundle (2) are located, and the slot (5.6) must simply be located at a suitable point of entry on the periphery since the chamber (C) extends around the periphery of the end of the exchanger where the hot gas inlet is located.

There is an intake manifold (6) in the hot gas inlet communicating the hot gas conduit with the inside of the tubes of the tube bundle (2), and there is an exhaust manifold (7) at the hot gas outlet communicating the inside of the tubes (2) with the cooled gas outlet conduit.

In this embodiment, the intake manifold (6) and the exhaust manifold (7) are attached to the shell (1). In the case of the intake manifold (6), attachment with the shell is by means of the manifold element (5), although in another alternative the attachment is established by locating the intake manifold (6) between the manifold element (5) and the shell (1).

By means of this configuration, the elastically deformable perimetral collar (5.1) of the manifold element (5) establishes a barrier between the liquid coolant located inside the chamber (C) and the hot gas located inside the intake manifold (6). In other words, the attachment between the intake manifold (6) and the heat exchanger is established in the region where the outer attachment region (5.3) is located.

In an embodiment not shown in drawings, the intake manifold (6) is attached to the manifold element (5) in a region where the inner attachment region (5.4) is located, for example the segment of the intake manifold (6) to be attached being located between the first baffle (3) and the manifold element (5).

In this alternative configuration, the elastically deformable perimetral collar (5.1) establishes a separation between the liquid coolant housed in the chamber (C) and the outside of the heat exchanger.

FIG. 2 also shows a deflector (8) in the form of an intermediate baffle configured as a comb entering part of the channels formed between the flat tubes. This deflector modifies streamlines of the liquid coolant flow by forcing the latter to cling to the inner wall of the first baffle (3) to a higher degree in order to eliminate any stagnation region, which goes against the tendency of the flow to head to the opposite outlet.

Figure 3:
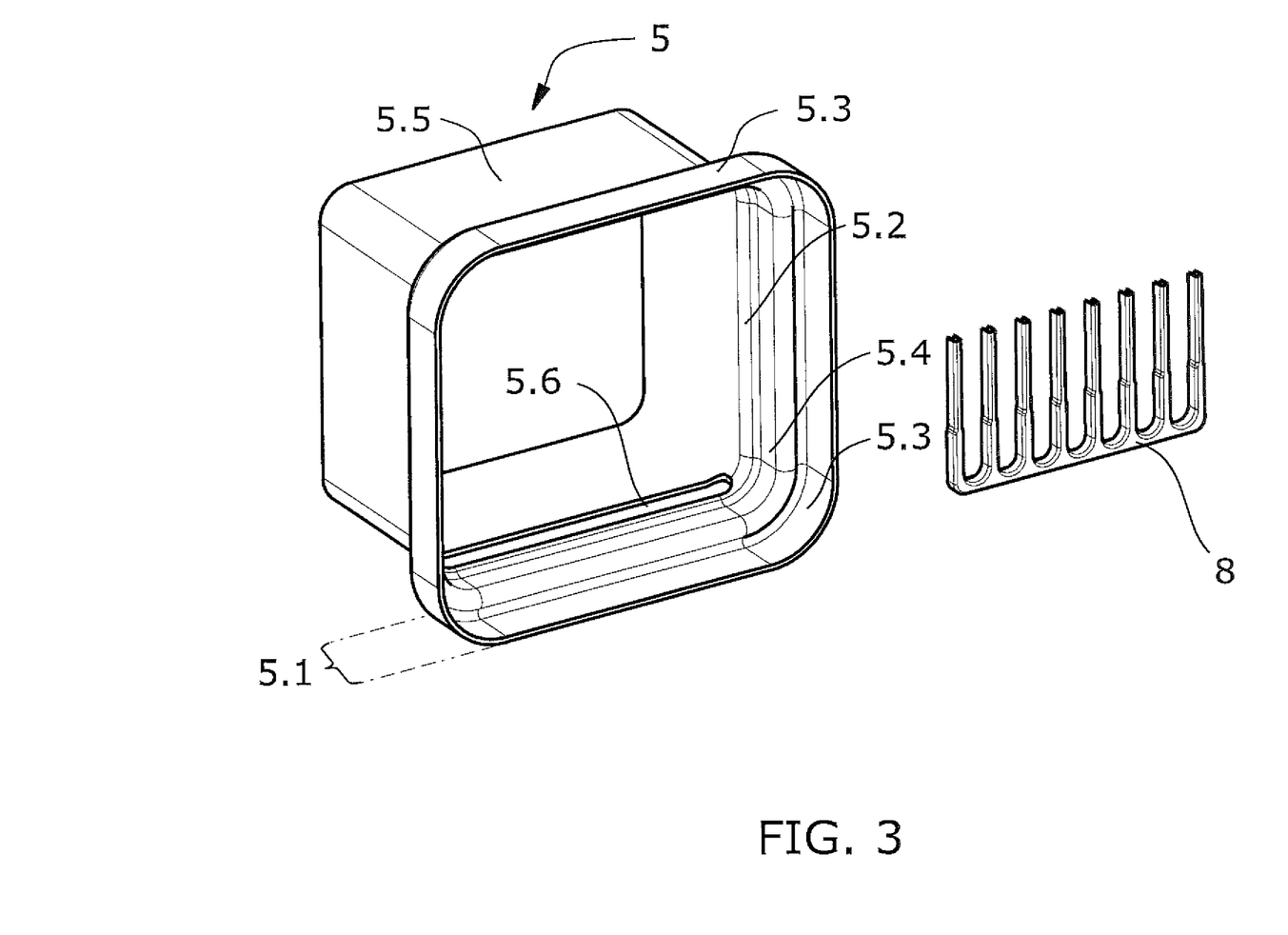
FIG. 3 shows two components of the heat exchanger, i.e., the manifold element and an internal deflector, according to one embodiment.
Figure 4:
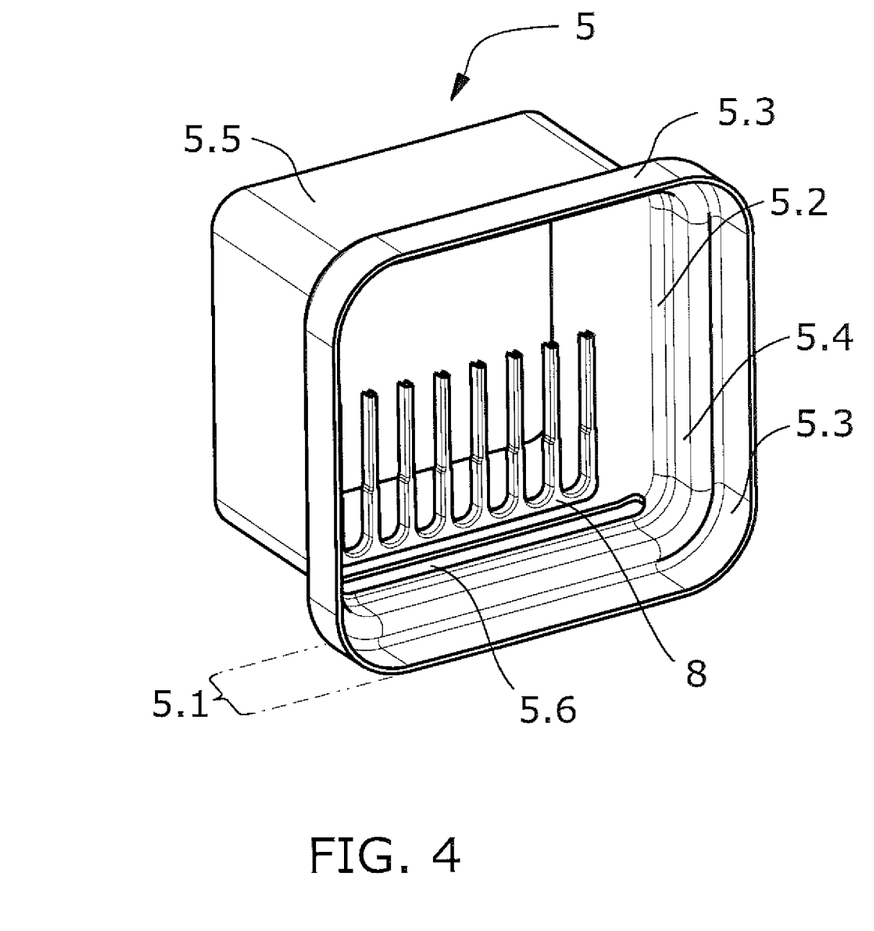
FIG. 4 shows the same two components where the internal deflector is located in its final position with respect to the manifold element.

According to a preferred embodiment, this deflector (8) is attached to the inside of the manifold element (5) instead of being attached to the inner wall of the shell (1), as shown in FIG. 4. FIG. 3 shows the manifold element (5) and the deflector (8) separated from one another, and FIG. 4 shows the deflector (8) attached in its final position inside the manifold element (5).

The manifold element (5) is preferably manufactured as a single part. In the described embodiments, this part is formed by punched and stamped sheet metal.

In addition to solving the described technical problems, the manifold element (5) facilitates assembly of the heat exchanger for it to later go through the brazing furnace, and even more so when it incorporates the deflector (8).

A second inventive aspect relates to the method of assembly of a heat exchanger according to the first inventive aspect. The method comprises the following steps:

i) assembling the first fixing baffle (3) on the manifold element (5), and assembling the second fixing baffle (4) on the shell (1), wherein both assembly operations can be carried out in any order.

ii) assembling the assembly formed by the first baffle (3) and the manifold element (5) on the shell (1), at the end opposite where the second baffle (4) is located. The assembly comprising the manifold element (5) and the first baffle (3) is located at the end of the shell (1), opposite to the end where the second baffle (4) is located, and it is housed in the enlargement (1.3) of the shell (1).

iii) assembling the heat exchange tubes (2) between the first fixing baffle (3) and the second fixing baffle (4). Both the first baffle (3) and the second baffle (4) have a surface with perforations coinciding with the section of the tubes of the tube bundle (2) they house. When the manifold element (5) comprises a deflector (8), the latter serves as a guide during the operation of inserting the exchange tubes through the perforations, such that after passing the first baffle (3) the tubes reach the second baffle (4) in a guided manner.

Brazing paste is incorporated in any of the steps in the assembled parts to be attached, and as an additional step, iv) sending the assembled assembly through the brazing furnace for attaching the assembly by brazing.

In the described examples, the intake manifold (6) and the exhaust manifold (7) are incorporated before going through the brazing furnace.

The invention claimed is:

1. A compact heat exchanger for a heat exchange between a hot gas and a liquid coolant comprising:

a) a shell extending according to a longitudinal direction to allow a passage of the liquid coolant between a liquid coolant inlet/outlet and a liquid coolant outlet/inlet;

b) a heat exchange tube bundle for a passage of the hot gas, housed in the shell, extending according to the longitudinal direction between a first fixing baffle located on a hot gas inlet/outlet side and a second fixing baffle located on a hot gas outlet/inlet side; and c) the second fixing baffle is attached to the shell; wherein d) the first fixing baffle is attached to the shell by means of a tubular-shaped manifold element wherein:

i. the end of the manifold element located at a hot gas inlet/outlet end according to the longitudinal direction comprises an elastically deformable perimetral collar with an outer attachment region and an inner attachment region, wherein the outer attachment region has a characteristic diameter that is larger than the characteristic diameter of the inner attachment region, characteristic diameter being defined as four times the area of the cross section divided by the perimeter of said section, such that the first baffle is attached to the manifold element through the inner attachment region of the manifold element, and the outer attachment region of the manifold element is attached to the shell, and ii. at least one tubular segment of the manifold element extends according to the longitudinal direction from the perimetral collar to the hot gas outlet/inlet side and is completely housed inside the shell, establishing a perimetral chamber in fluid communication with the liquid coolant inlet/outlet and in fluid communication with an inside of the shell;

wherein the end of the manifold element located at an opposite end of the hot gas inlet/outlet, according to the longitudinal direction, is attached to the surface of the shell, wherein the first fixing baffle and the second fixing baffle are end baffles disposed at opposite ends of the heat exchange tube bundle, and the first fixing baffle and the second fixing baffle are the only ones of the end baffles for the heat exchange tube bundle.

2. The heat exchanger according to claim 1, wherein the perimetral chamber is configured by means of an enlargement of the shell in a segment according to the longitudinal direction in which the at least one tubular segment of the manifold element extends.

3. The heat exchanger according to claim 1, wherein the perimetral collar establishes a fluid barrier between the inside of the shell where the liquid coolant is located and an inlet into the tube bundle where the hot gas is located.

4. The heat exchanger according to claims 1, wherein the end of the manifold element located at an opposite end of the hot gas inlet/outlet according to the longitudinal direction establishes a sliding support with a surface of the shell that slides according to the longitudinal direction, where the sliding support establishes a closure of the perimetral chamber formed between the shell and the manifold element.

5. The heat exchanger according to claim 4, wherein the sliding support is established in an enlarged segment configured according to a step-like section of the shell.

6. The heat exchanger according to claim 1, wherein the tubular segment of the manifold element comprises an elastically deformable segment that is elastically deformable in at least a perimetral region of the tubular segment, preferably configured like a bellows, to reduce stressing due to expansion of the manifold element according to the longitudinal direction.

7. The heat exchanger according to claim 1, wherein the manifold element comprises one or more slots for fluid communication between the perimetral chamber and the inside of the shell where the tube bundle is housed.

8. The heat exchanger according to claim 7, wherein at least one of the slots is located in a position opposite the liquid coolant inlet/outlet with respect to the perimetral chamber.

9. The heat exchanger according to claim 1, wherein the elastic perimetral collar has a section that is:
in corrugated form with at least one double transition curve;
in multi-step form;
straight with stamped protrusions; or
a combination of any of the foregoing.

10. The heat exchanger according to claim 1, wherein the manifold element is configured as a single part.

11. An EGR system or WHRS system comprising a heat exchanger according to claim 1.

12. A method of assembly of a heat exchanger configured according to claim 1, comprising the following steps:

i) assembling the first fixing baffle on the manifold element, and assembling the second fixing baffle on the shell;

ii) assembling the assembly formed by the first baffle and the manifold element on the shell;

iii) assembling the heat exchange tubes between the first fixing baffle and the second fixing baffle;

wherein brazing paste is incorporated in any of the steps in the assembled parts to be attached, and iv) sending the assembled assembly through the brazing furnace for attaching the assembly by brazing.

13. The method of assembly according to claim 12, wherein the manifold element comprises at least one deflector, configured as an intermediate baffle, of the liquid coolant flowing between tubes of the tube bundle, and wherein step iii) of assembling the exchange tubes is performed by the guided insertion through the at least one deflector.

14. The method of assembly according to claim 12, further comprising, between steps iii) and iv), the step of inserting a manifold at the intake and at the exhaust.

15. The heat exchanger according to claim 1, wherein the first fixing baffle and the second fixing baffle are configured to separate the hot gas and the liquid coolant from one another.

* * * * *